(12) United States Patent
Kang et al.

(10) Patent No.: US 9,953,109 B2
(45) Date of Patent: Apr. 24, 2018

(54) OBJECT MODELING METHOD AND APPARATUS

(71) Applicant: Samsung Electronics Co., Ltd., Suwon-si (KR)

(72) Inventors: Nahyup Kang, Seoul (KR); Jiyeon Kim, Hwaseong-si (KR); Hyong-euk Lee, Suwon-si (KR); Hwiryong Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 14/825,755

(22) Filed: Aug. 13, 2015

(65) Prior Publication Data

US 2016/0063140 A1 Mar. 3, 2016

(30) Foreign Application Priority Data

Aug. 26, 2014 (KR) .................. 10-2014-0111467
Apr. 28, 2015 (KR) .................. 10-2015-0059496

(51) Int. Cl.
*G06G 7/48* (2006.01)
*G06F 17/50* (2006.01)
*G06F 17/10* (2006.01)

(52) U.S. Cl.
CPC .............. *G06F 17/50* (2013.01); *G06F 17/10* (2013.01); *G06F 17/5009* (2013.01); *G06F 2217/16* (2013.01)

(58) Field of Classification Search
CPC .......... G03F 1/20; G01B 9/04; G01S 13/723; B29C 7/088; G06T 7/251; H01J 37/222; A63F 13/10; G06F 17/5009; G06F 3/016; G06K 9/6202
See application file for complete search history.

(56) References Cited

U.S. PATENT DOCUMENTS

| | | | |
|---|---|---|---|
| 7,479,963 B2 | 1/2009 | Lischinski et al. |
| 7,914,673 B2 | 3/2011 | Frey et al. |
| 8,041,550 B1 | 10/2011 | Thuerey et al. |
| 8,204,725 B1 | 6/2012 | Thuerey et al. |

(Continued)

FOREIGN PATENT DOCUMENTS

| | | |
|---|---|---|
| EP | 2 521 113 A1 | 11/2012 |
| EP | 2 538 359 A2 | 12/2012 |

(Continued)

OTHER PUBLICATIONS

Cirio, Gabriel, et al. "Six Degrees-of-Freedom Haptic Interaction with Fluids." *Visualization and Computer Graphics, IEEE Transactions on* 17.11 (2011): 1714-1727.

(Continued)

*Primary Examiner* — Kandasamy Thangavelu
(74) *Attorney, Agent, or Firm* — NSIP Law

(57) ABSTRACT

Provided is a method and apparatus for modeling objects that may include detecting an adjacent area that shares modeled particles of a first object and modeled particles of a second object, calculating an action force between the first object and the second object in the adjacent area based on information stored for grid points of a grid defined with respect to the adjacent area, and modelling the first object and the second object based on the calculated action force.

22 Claims, 14 Drawing Sheets

(56) References Cited

U.S. PATENT DOCUMENTS

| | | | |
|---|---|---|---|
| 8,423,327 B2 | 4/2013 | Lacome | |
| 9,478,033 B1* | 10/2016 | Safreed | G06T 7/251 |
| 2002/0091005 A1* | 7/2002 | Shoji | A63F 13/10 |
| | | | 472/65 |
| 2003/0059689 A1* | 3/2003 | Ehrmann | G03F 1/20 |
| | | | 430/5 |
| 2009/0020901 A1* | 1/2009 | Schillen | B29C 70/88 |
| | | | 264/31 |
| 2010/0191391 A1* | 7/2010 | Zeng | G01S 13/723 |
| | | | 701/1 |
| 2010/0277475 A1 | 11/2010 | McAdams et al. | |
| 2011/0261083 A1* | 10/2011 | Wilson | G06F 3/016 |
| | | | 345/676 |
| 2013/0336583 A1* | 12/2013 | Ernst | G06K 9/6202 |
| | | | 382/165 |
| 2014/0122034 A1* | 5/2014 | Hanson | G06F 17/5009 |
| | | | 703/2 |
| 2015/0136976 A1* | 5/2015 | Matsuoka | H01J 37/222 |
| | | | 250/306 |
| 2015/0153558 A1* | 6/2015 | Ozcan | G01B 9/04 |
| | | | 348/79 |

FOREIGN PATENT DOCUMENTS

| | | |
|---|---|---|
| JP | 2001-305022 A | 10/2001 |
| KR | 10-0872434 B1 | 12/2008 |
| KR | 10-0984048 B1 | 9/2010 |
| KR | 10-1180057 B1 | 9/2012 |
| KR | 10-1244826 B1 | 3/2013 |
| KR | 10-1319996 B1 | 10/2013 |
| KR | 10-1350732 B1 | 1/2014 |
| KR | 10-2014-0050838 A | 4/2014 |
| WO | WO 2014/094410 A1 | 6/2014 |

OTHER PUBLICATIONS

Extended European Search Report dated Jan. 22, 2016 in counterpart European Application No. 15181926.5.

\* cited by examiner

OBJECT MODELING METHOD AND APPARATUS

CROSS-REFERENCE TO RELATED APPLICATIONS

This application claims the priority benefit of Korean Patent Application No. 10-2014-0111467, filed on Aug. 26, 2014, and Korean Patent Application No. 10-2015-0059496, filed on Apr. 28, 2015, in the Korean Intellectual Property Office, the disclosures of which are incorporated herein by reference.

BACKGROUND

1. Field

One or more embodiments of the following description relate to an object modeling method and apparatus.

2. Description of Related Art

In relation to a fluid simulation in a computer graphics (CG) area, in particular, in a visual effects (VFX) field, research is ongoing to numerically solve for the flow of a fluid. The Navier-Stokes equation regards a fluid as a sum of diminutive particles, and expresses interactions and movements between the particles. When a relatively ideal situation is assumed, the Navier-Stokes equation may be changed to the Bernoulli's principle. Typically, for realistic reproduction of fluid modeling based on the Navier-Stokes equation, incompressible conditions are to be satisfied.

In addition, with the simulation of deformable objects, it is typically desired that the simulations incorporate real-time model responses that have sufficiently high calculation accuracies so as to appear natural to a viewer's eyes. In such approaches, a model considering a physical characteristic of a deformable object, a boundary condition, and an external force applied may be used.

In the CG area, a simulation of a fluid and a simulation of a deformable object may typically be performed separately and independently. However, in a general environment, a fluid and a deformable object coexist and affect each other.

SUMMARY

One or more embodiments provide a method of modeling objects, the method including detecting an adjacent area shared by modeled particles of a first object and modeled particles of a second object, where one or more particles of the first object are adjacent to one or more particles of the second object in the adjacent area, defining a grid with respect to the adjacent area, calculating an action force between the first object and the second object in the adjacent area based on information stored for grid points of the grid, and modeling the first object and the second object based on the calculated action force.

The defining of the grid may include extracting distance values between a contour of the first object or the second object in the adjacent area and the grid points of the grid, and storing the extracted distance values in a memory for each of the grid points.

The calculating may include determining whether collisions occur between particles of the first object in the adjacent area and particles of the second object in the adjacent area, and calculating action forces between the particles of the first object in the adjacent area and the particles of the second object in the adjacent area based on a result of the determining of whether the collisions occur.

The determining of whether the collisions occur may include determining whether the collisions occur based on distance values stored in a memory for corresponding grid points adjacent to respective positions of the particles of the first object in the adjacent area.

The determining of whether the collisions occur may further include determining whether the particles of the first object satisfy volume preservation conditions.

The calculating of the action forces between the particles of the first object in the adjacent area and the particles of the second object in the adjacent area may include detecting a colliding particle of the first object that collides with the second object in the adjacent area, when occurrence of the collisions is determined, redefining a position of the detected colliding particle of the first object, and calculating an action force applied by the first object to the second object and in response to the redefining of the position of the detected colliding particle of the first object.

The redefining of the position of the detected colliding particle of the first object may include redefining the position of the detected colliding particle of the first object to a position where the colliding particle of the first object does not penetrate through the second object.

The redefining of the position of the detected colliding particle of the first object may further include calculating a moving direction and a shortest moving distance, for the redefining of the position of the detected colliding particle of the first object, based on gradients and distance values stored in a memory for grid points corresponding to a cell of the grid that includes the detected colliding particle of the first object, and so that the colliding particle of the first object does not penetrate through the second object, and relocating the detected colliding particle of the first object based on the calculated moving direction and the calculated shortest moving distance.

The method may further include calculating a moving velocity of the detected colliding particle of the first object based on the distance values stored in the memory for the corresponding grid points and the calculated shortest moving distance, and storing the calculated moving velocity in the memory for the corresponding grid points.

The calculating of the action force applied by the first object may include calculating a force estimated to be applied by the second object to the detected colliding particle of the first object at the redefined position, and calculating the action force applied by the first object to the second object, applied in response to the redefining of the position of the detected colliding particle of the first object, based on the calculated force estimated to be applied by the second object.

The method may further include storing the calculated action force in the memory for grid points of the grid corresponding to the redefined position of the detected colliding particle of the first object.

The first object and the second object may be heterogeneous, and the first object may correspond to a fluid and the second object may correspond to a deformable object.

One or more embodiments provide non-transitory computer-readable medium including computer readable code to control at least one processing device to implement one or more methods discussed above.

One or more embodiments provide an apparatus for modeling objects, the apparatus including a processor configured to perform a grid converting operation to detect an adjacent area sharing modeled particles of a first object and modeled particles of a second object and to define a grid with respect to the adjacent area, and configured to perform an object modelling operation to calculate an action force between the first object and the second object in the adjacent area based on information stored for grid points of the grid and to model the first object and the second object based on the calculated action force.

To perform the grid converting operation, the processor may be further configured to extract distance values between a contour of the first object or the second object in the adjacent area and the grid points of the grid, and to store the extracted distance values in a memory for each of the grid points of the grid.

To perform the object modeling operation, the processor may be further configured to determine whether collisions occur between particles of the first object in the adjacent area and particles of the second object in the adjacent area, detect a colliding particle of the first object that collides with the second object in the adjacent area, based on a result of the determining of whether collisions occur, redefine a position of the detected colliding particle of the first object, and calculate an action force applied by the first object to the second object and in response to the redefining of the position of the detected colliding particle of the first object.

To redefine the position of the detected colliding particles, the processor may be further configured to calculate a moving direction and a shortest moving distance, for the redefining of the position of the detected colliding particle of the first object, based on gradients and distance values stored in a memory for grid points corresponding to a cell of the grid that includes the detected colliding particle of the first object, and so that the colliding particle of the first object does not penetrate through the second object, and is further configured to relocate the detected colliding particle of the first object based on the calculated moving direction and the calculated shortest moving distance.

To calculate the action force applied by the first object to the second object, the processor may be further configured to calculate a force estimated to be applied by the second object to the detected colliding particle of the first object at the redefined position, calculate the action force applied by the first object to the second object, applied in response to the redefining of the position of the detected colliding particle of the first object, based on the calculated force estimated to be applied by the second object, and store the calculated action force in the memory for grid points of the grid corresponding to a cell including the detected colliding particle of the first object.

One or more embodiments provide an apparatus for modeling objects, the apparatus including a memory configured to store a program to control an operation of the apparatus, and at least one processor configured to execute the program to control the processor to detect an adjacent area sharing modeled particles of a first object and modeled particles of a second object, to define a grid including a plurality of cells with respect to the adjacent area, to calculate an action force between the first object and the second object in the adjacent area based on information for grid points of the grid, and to model the first object and the second object based on the calculated action force.

One or more embodiments provide a method of modeling objects, the method including detecting an adjacent area sharing modeled particles of a first object and modeled particles of a second object, selectively modifying shapes or motions of the first and second objects, for particles of the adjacent area, based on calculated reactionary forces between detected colliding particles of the first object and the second object in the adjacent area and in response to collisions being determined to occur in cell units of the adjacent area, and selectively modifying positions of particles of the first object outside of the adjacent area based on repulsive forces applied to the particles of the first object outside of the adjacent area for collision avoidance.

The calculated reactionary forces between the detected colliding particles of the first object and the second object are forces may be based on positions of particles of the first object being changed so as to not penetrate the second object.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
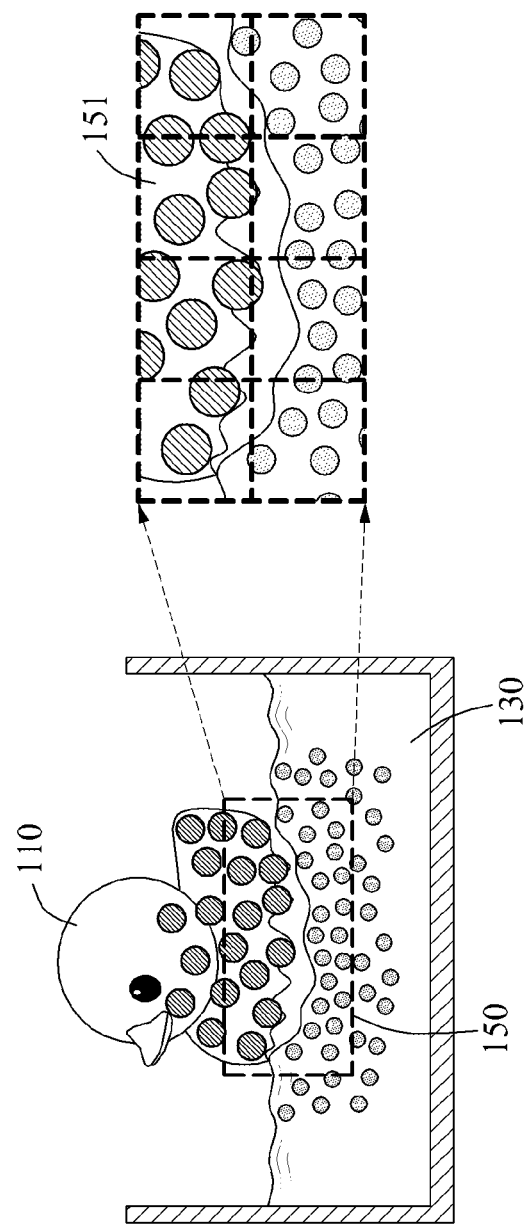
FIG. 1 illustrates an adjacent area of particles of a first and second object, according to one or more embodiments.

The following detailed description is provided to assist the reader in gaining a comprehensive understanding of the methods, apparatuses, and/or systems described herein. However, after an understanding of the present disclosure, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that may be well known to one of ordinary skill in the art may be omitted for increased clarity and conciseness.

The features described herein may be embodied in different forms, and are not to be construed as being limited to the examples described herein.

Various alterations and modifications may be made to the exemplary embodiments, some of which will be illustrated in detail in the drawings and detailed description. However, it should be understood that these embodiments are not construed as limited to the illustrated forms and include all changes, equivalents, or alternatives within the idea and the technical scope of this disclosure.

Terms used herein are to merely explain specific embodiments, thus it is not meant to be limiting. A singular expression includes a plural expression except when two expressions are contextually different from each other. For example, as used herein, the singular forms "a," "an" and "the" are intended to include the plural forms as well, unless the context clearly indicates otherwise. Herein, a term "include" or "have" are also intended to indicate that characteristics, figures, operations, components, or elements disclosed on the specification or combinations thereof exist. The term "include" or "have" should be understood so as not to pre-exclude existence of one or more other characteristics, figures, operations, components, elements or combinations thereof or additional possibilities.

Unless otherwise defined, all terms including technical and scientific terms used herein have the same meaning as commonly understood by one of ordinary skill in the art to which this invention belongs, in view of the present disclosure. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

Hereinafter, certain embodiments will be explained in more detail with reference to the attached drawings, wherein like reference numerals refer to like elements throughout. Like or the same component or components corresponding to each other will be provided with the same reference numeral, and their detailed explanation will be omitted. When it is determined that a detailed description of a related or known function or configuration may make a purpose of an embodiment of the present disclosure unnecessarily ambiguous, such a detailed description may be omitted.

FIG. 1 illustrates an adjacent area of particles of a first and second object, according to one or more embodiments.

Referring to FIG. 1, a deformable object 110, for example, a rubber duck, floating on a fluid 130 such as, for example, water and oil, is illustrated. The deformable object 110 and the fluid 130 may be respectively modeled by particles. Thus, hereinafter, the deformable object 110 may be represented by deformable object particles, and the fluid 130 may be represented by fluid particles. The deformable object 110 may include a rigid body and a soft or deformable body, or may merely be the soft or deformable body. Herein, an "adjacent area" or an "interaction area" means a predetermined area including adjacent contours of a first object and a second object, e.g., the deformable object 110 and the fluid 130.

Figure 3:
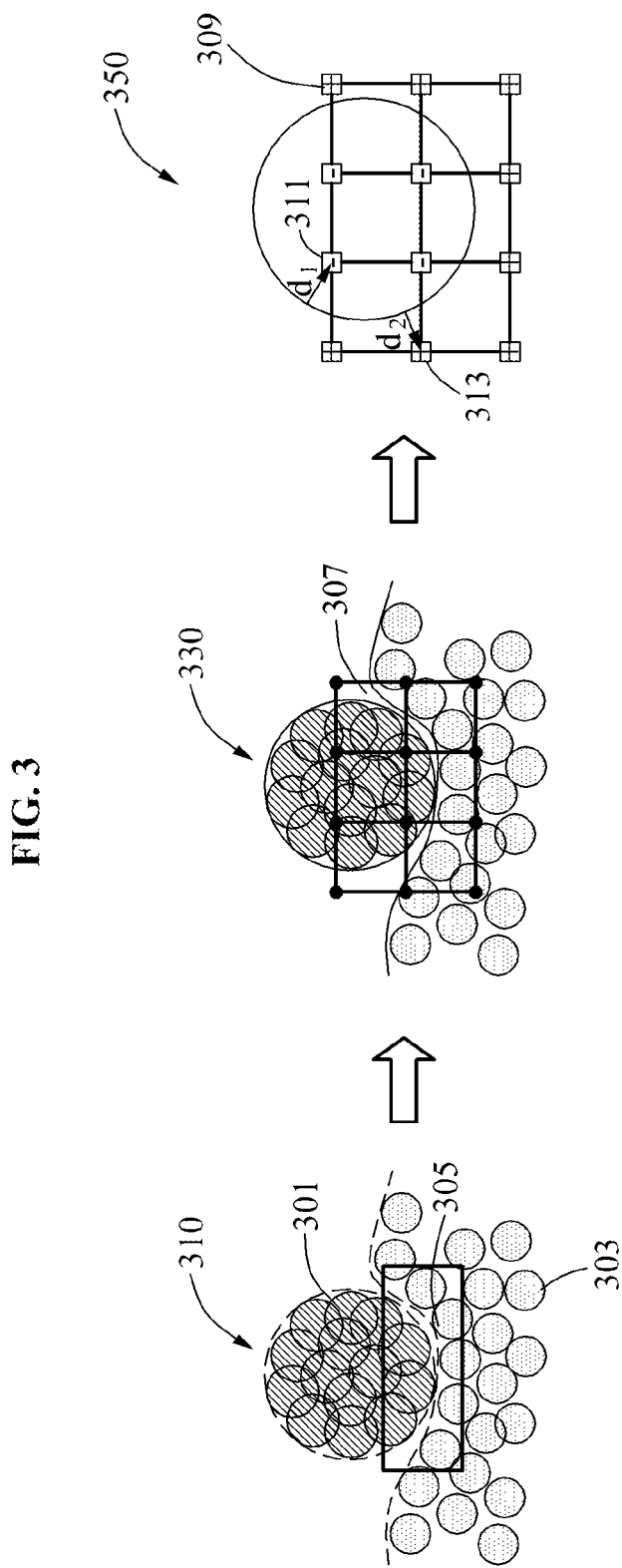
FIG. 3 illustrates an operation of defining a grid with respect to an adjacent area of particles of a deformable object and a fluid, according to one or more embodiments.

In one or more embodiments, when the deformable object 110 and the fluid 130 coexist, an interaction between the deformable object 110 and the fluid 130 may be reflected by defining a cell based arrangement, e.g. grid 150, with respect to the adjacent area and applying the laws of physics based on the cell based arrangement. The example grid 150 may be provided in a data structure in a form of meshes having a uniform connection relationship, as only an example, and may further be utilized as a path through which mutual physical qualities of the deformable object 110 and the fluid 130 are exchanged. Thus, the grid 150 may include a plurality of cells 151. In an embodiment, level set information of the deformable object 110 may be stored as scalar values at or for grid points of the grid 150. The level set information may refer to distance values with representative positive and negative marks, such as illustrated in FIG. 3, and may be used to indicate a position of the deformable object 110 within the grid 150. The level set information may indicate whether a grid point of the deformable object 110 is positioned outside the grid 150 or inside the grid 150 based on a contour of the deformable object 110.

For example, when the deformable object 110 collides with the fluid 130, a shape of the deformable object 110 may be crushed by the collision with the fluid 130 or a velocity of the deformable object 110 may decrease, and a spray may occur on the fluid 130. In this example, the fluid 130 may be modeled to fluidly move while avoiding a space occupied by the deformable object 110. The grid 150 may include some or all areas in which interactions between the deformable object 110 and the fluid 130 occur, for example, such as a collision area between the deformable object 110 and the fluid 130, an area in which a spray may occur on the fluid 130, and an area newly occupied by the crushed deformable object 110 in the space. The interactions described above may be identically applicable to heterogeneous objects, for example, a fluid and a deformable object, and homogeneous objects, for example, water and oil. In one or more embodiments, by calculating an action force using the grid 150 with respect to such an adjacent area including a contour between objects modeled based on particles, a momentum by interaction may be precisely preserved.

Figure 2:
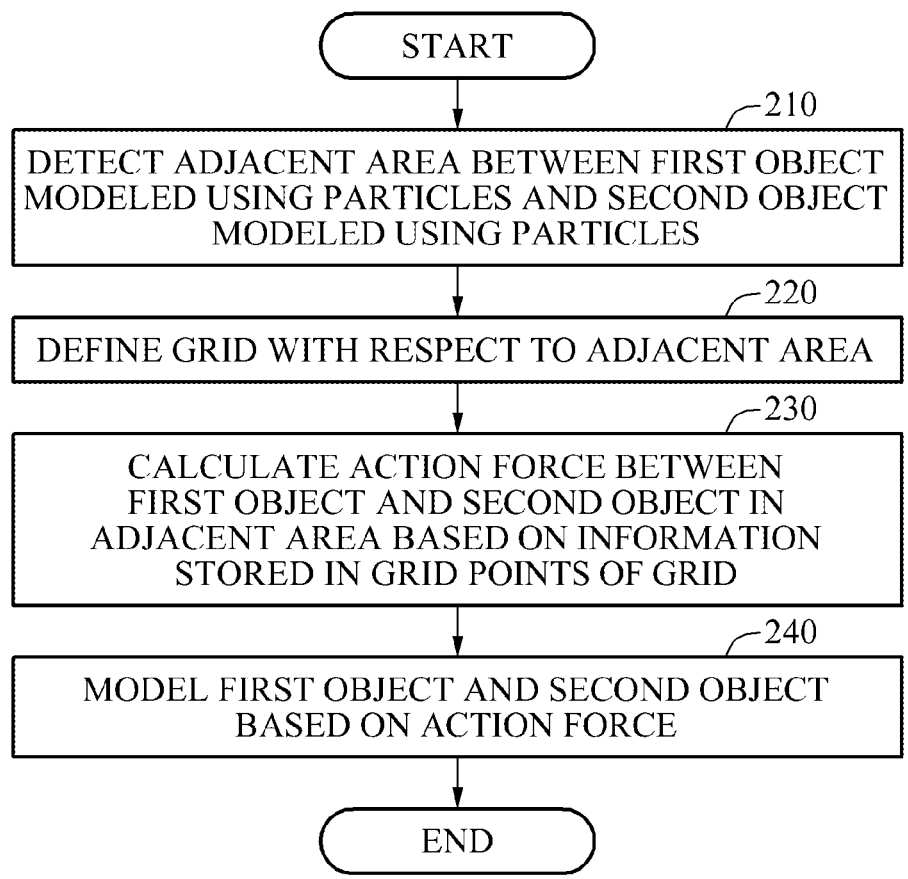
FIG. 2 illustrates a method of modeling objects, according to one or more embodiments.

FIG. 2 illustrates a method of modeling objects, according to one or more embodiments.

Referring to FIG. 2, in operation 210, an apparatus for modeling objects, hereinafter, referred to as a "modeling apparatus", may detect an adjacent area between a first object modeled using particles and a second object modeled using particles. When an object is to be modeled based on particles, the modeling apparatus may search for neighboring particles of a particular particle, e.g., of one of the objects. When the found neighboring particles are determined to correspond to different objects having different physical qualities, the modeling apparatus may define, as an adjacent area, an area including the particular particle and the found neighboring particles corresponding to the different objects.

In operation 220, the modeling apparatus may define a grid with respect to the detected adjacent area. For example, object particles included in the detected adjacent area may be organized or fall into one of a plurality of cells of the grid, e.g., based on where/how the grid overlaps the adjacent area. In operation 220, the modeling apparatus may extract vertical distance values between a contour of the first object or the second object in the adjacent area and grid points, of the grid, adjacent to the contour. The modeling apparatus may store the extracted distance values at or for the respective grid points, e.g., in a memory that respectively represents the corresponding grid points. The distance values stored at or for the grid points may be referred to as level set information. A method of defining the grid will be described in greater detail with reference to FIG. 3.

In operation 230, the modeling apparatus may calculate an action force between the first object and the second object in the adjacent area based on the information stored at or for the grid points of the grid. For example, in operation 230, the modeling apparatus may determine whether collisions occur between the particles of the first object and the particles of the second object in cell units of the grid in the adjacent area. Based on this determination, the modeling apparatus may then calculate the corresponding action forces between the particles of the first object and the particles of the second object. Here, as only an example, the first object may be a fluid and the second object may be a deformable object, e.g., heterogeneous objects. Alternatively, the first object and the second object may be homogeneous objects, such as when the first object is fluid water and the second object is fluid oil. A method of calculating the action force between the first object and the second object will be described in greater detail with reference to FIGS. 4 and 5.

In operation 240, the modeling apparatus may model the first object and the second object based on the calculated action forces, e.g., the modeling apparatus may modify shapes or motions of the first object and the second object based on the calculated action forces.

FIG. 3 illustrates an operation of defining a grid with respect to an adjacent area of particles of a deformable object and a fluid, according to one or more embodiments.

Referring to FIG. 3, a modeling apparatus may detect an adjacent area 305 between a deformable object 301 modeled using particles and a fluid 303 modeled using particles, in operation 310, and may define a grid 307 with respect to the adjacent area 305 or perform gridding for expressing the adjacent area 305 in a grid or cell structure in operation 330. As only examples, using this gridding approach, four particles may be included or organized in a single cell in the two-dimensional (2D) case, and eight particles may be included or organized in a single cell in the three-dimensional (3D) case.

In operation 350, level set information corresponding to distance values between respective grid points 309 and a closest contour of the deformable object 301 may be stored in or for the grid points 309 of the grid 307. For example, a vertical distance value $d_1$ between a contour of the deformable object 301 and a grid point 311 may be stored in or for the grid point 311, and a vertical distance value $d_2$ between the contour of the deformable object 301 and a grid point 313 may be stored in or for the grid point 313. When a distance value stored in or for one of the grid points 309 is a positive (+) value, the distance value may thereby indicate that the corresponding grid point is disposed outside of the deformable object 301. When a distance value stored in or for one of the grid points 309 is a negative (−) value, the distance value may thereby indicate that the corresponding grid point is disposed inside the deformable object 301. Depending on a modeling method, the representations of the positive (+) and negative (−) values may be reversely set. The modeling apparatus may calculate gradients based on the level set information, and convert the level set information into geometric normal information, as necessary.

Separately from the level set information, action forces applied by the deformable object 301 to the particles of the fluid 303 may also be calculated through linear interpolation and stored in or for the respective grid points 309 of the grid 307. The stored action forces may be later used to model the particles of the deformable object 301. In addition, velocity values of the particles of the fluid 303 may also be stored in or for the respective grid points 309, and the stored velocity values may be used to calculate drag forces applied to the particles of the fluid 303.

Through the process described with reference to FIG. 3, the modeling apparatus may determine a distance between a grid point and a contour of an object, and determine whether the grid point is disposed inside or outside the contour.

Figure 4:
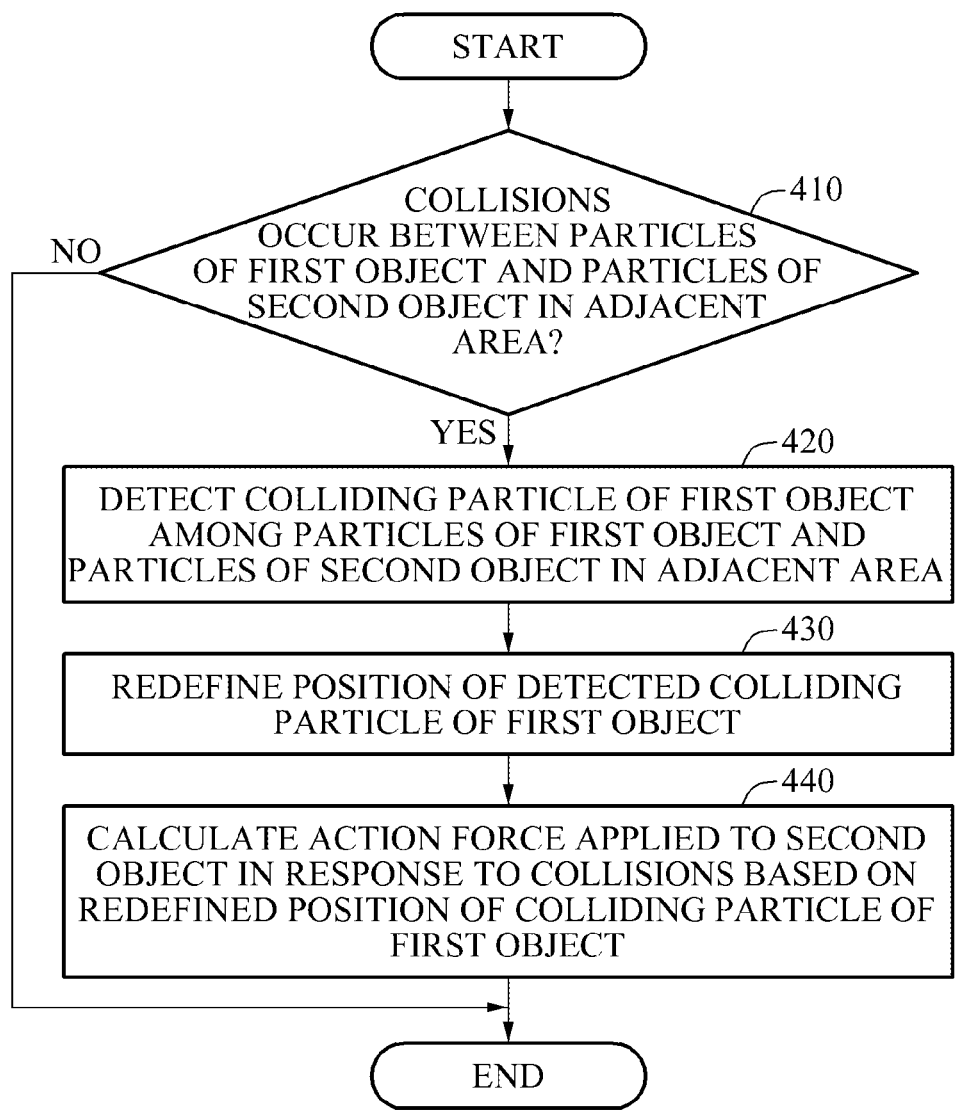
FIG. 4 illustrates an operation of calculating an action force between a first object and a second object, according to one or more embodiments.

FIG. 4 illustrates an operation of calculating an action force between a first object and a second object, according to one or more embodiments.

Referring to FIG. 4, in operation 410, a modeling apparatus according to one or more embodiments may determine whether collisions occur between particles of a first object and particles of a second object, e.g., in an identified adjacent area. In operation 410, the modeling apparatus may determine whether the collisions occur based on the above discussed distance values stored in or for grid points adjacent to positions of the particles of the first object. In this example, the modeling apparatus may determine whether the collisions occur in cell units of the example grid. For example, when a particle of the first object, for example, a fluid, and a particle of the second object, for example, a deformable object, overlap at a same position, that is, when the fluid particle is disposed at a position so that it would penetrate through the deformable object particle, a collision may be determined to have occurred between particles.

In operation 410, the modeling apparatus may further determine whether the particles of the first object satisfy volume preservation conditions. For example, when the first object corresponds to a fluid and the second object corresponds to a deformable object, an overall volume of the fluid corresponding to the first object may be preserved, although a positional change may occur between the first object and the second object in response to a collision. Thus, in one or more embodiments, in addition to relying on the distance values being stored at or for the grid points, whether the overall volume of the fluid remains the same as before the collision occurs may also be considered when the collision occurs.

When collisions are not determined to occur in operation 410, the modeling apparatus may not perform operations 420 through 440.

Conversely, when collisions are determined to occur in operation 410, the modeling apparatus may detect a colliding particle of the first object, among the particles of the first object and the particles of the second object, in the adjacent area, in operation 420. In this example, a single colliding particle or a plurality of colliding particles may be detected.

In operation 430, the modeling apparatus may redefine the position of the detected colliding particle of the first object. The modeling apparatus may redefine the position of the detected colliding particle of the first object to be a position at which the colliding particle of the first object does not penetrate through the contour or a particle of the second object. For example, when the first object corresponds to a fluid and the second object corresponds to a deformable object, a fluid particle may be modeled to fluidly move by avoiding, rather than penetrating through, a deformable object particle when a collision occurs between the fluid and the deformable object. Thus, when a collision is determined to occur between the fluid particle and the deformable object particle, the modeling apparatus may perform modeling so that the fluid particle may rather now be disposed at a position where the fluid particle would not penetrate through the deformable object particle.

In operation 430, the modeling apparatus may calculate a moving direction and a shortest moving distance of the colliding particle of the first object, e.g., based on gradients and distance values stored in or for grid points corresponding to a cell of the grid that includes including the detected colliding particle of the first object, so that the colliding particle of the first object may not penetrate through the second object. The modeling apparatus may relocate the colliding particle of the first object based on the calculated moving direction and the calculated shortest moving distance, for example. In this example, the modeling apparatus may calculate a moving velocity of the colliding particle of the first object based on the distance values stored in or for the grid points and the calculated shortest moving distance, and store the calculated moving velocity in or for the grid points corresponding to the cell including the detected colliding particle of the first object.

In operation 440, the modeling apparatus may calculate an action force applied to the second object, in response to the collisions, based on the redefined position of the colliding particle of the first object. Thus, in operation 440, the modeling apparatus may calculate a force, estimated to be applied by the second object to the colliding particle of the first object at the redefined position of the colliding particle of the first object, and determine an action force applied to the second object in response to the collisions based on the calculated force. The modeling apparatus may store the calculated action force in or for a grid point of the grid corresponding to the redefined position of the colliding particle of the first object. Here, the referred to 'action' force is the force applied to the second object, while the force applied from the second object, e.g., to the example colliding particle of the first object, may also be referred to as an 'action' force. Either or both of these action forces may be stored by or for the grid points of the grid, for example.

Figure 5:
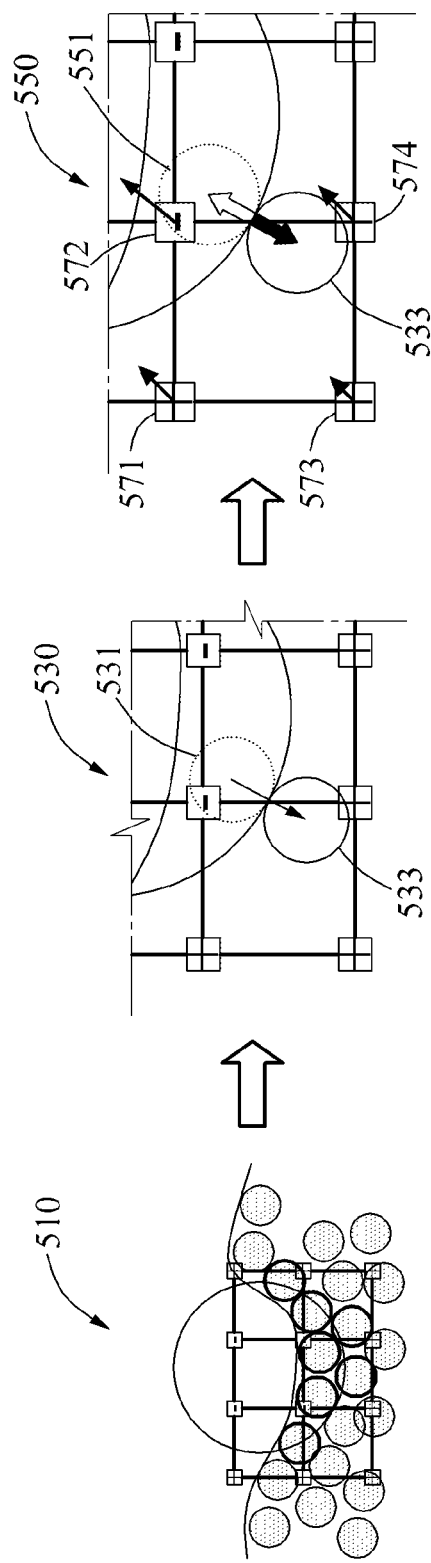
FIG. 5 illustrates an operation of calculating an action force between a first object and a second object, according to one or more embodiments.

FIG. 5 illustrates an operation of calculating an action force between a first object and a second object, according to one or more embodiments.

Referring to FIG. 5, marks such as "+" and "−", or an indicator of whether particle distances relative to the contour of the deformable object, for example, are positive or negative, may be used in operation 510, as indicated at each illustrated grid point. A modeling apparatus may calculate, for example, a distance value between a position of a particle of a first object, e.g., a fluid particle, and a contour of the second object, e.g., a deformable object, by interpolating a value stored in or for a corresponding grid point, such as discussed above with regard to FIG. 3. For example, in operation 510 of FIG. 5, a mark "−" for this calculated distance value, e.g., representing a negative value relative to the contour of the second object, may indicate a collision state, while a mark "+" for the calculated distance value, e.g., representing a positive value relative to the contour of the second object, may indicate a non-collision state. As described above, a process of performing such calculations through interpolation, for example, to determine whether a distance value stored in or for a grid point has a negative value or a positive value, respectively representing collision or non-collision states, at a position of a fluid particle may be referred to as "grid value query".

In this example, the modeling apparatus may determine whether a collision occurs between the first object and the second object based on the stored mark value, stored in or for each grid point. The modeling apparatus may sample distance values stored in or for four grid points in the vicinity of a position of each fluid particle. The modeling apparatus may perform linear interpolation on values stored in or for grid points in the vicinity of each fluid particle to determine the distance between the fluid particle and a particle on the contour of the example deformable object. When a sampled distance value corresponds to, for example, +0.5 nanometers (nm), it may indicate that a center of the fluid particle is 0.5 nm from the contour of the deformable object. When a radius of the fluid particle corresponds to 0.5 nm, the fluid particle may be in contact with the contour of the deformable object. When the radius of the fluid particle corresponds to 1.0 nm, the fluid particle may be determined to be in collision with the deformable object, for example, and may thus be disposed at a position that penetrates through the deformable object particle. In this example, the modeling apparatus may redefine the position of, or move, the corresponding fluid particle to a position where the fluid particle does not penetrate through the deformable object particle, thereby processing the collision of the fluid particle.

For example, as shown in operation 530, when a fluid particle disposed at a first position 531 is determined to correspond to an internal portion of the example deformable object, representing a collision between a deformable object particle and the fluid particle, the modeling apparatus may relocate the fluid particle from the first position 531 to a second position 533 where the fluid particle would not penetrate through the deformable object particle. In this example, the modeling apparatus may calculate a moving direction and a shortest moving distance for the fluid particle based on gradients and distance values stored in or for grid points corresponding to the grid cell that includes the detected fluid particle, so that the position of the fluid particle can be redefined so as to not penetrate through the deformable object particle.

Thus, the modeling apparatus may relocate colliding fluid particles to new positions, so that fluid particles would not collide with particles of the deformable object, based on the respective calculated moving directions and the calculated shortest moving distances. For example, the modeling apparatus may prevent a collision between the fluid particle and the deformable object particle by moving a fluid particle a shortest distance in an inclination direction in which distance values stored in or for grid points, corresponding to the cell that includes the fluid particle, change from negative (−) values to positive (+) values, and in this example, both in a horizontal direction from right to left and in a vertical direction from top to bottom.

The modeling apparatus may reflect a force estimated to be applied to the fluid particle in response to the collision between the deformable object and the fluid as a reaction force with respect to the deformable object by transmitting, to the deformable object, a force symmetrical or opposite to an impulse applied to reposition the fluid particle. Thus, when the fluid particle is relocated to the second position 553, a reaction force with a same magnitude as the force estimated to be applied to relocate the fluid particle may be applied to the deformable object in a symmetrical or opposite direction as shown in an area 551, based on the law of action and reaction, in operation 550. In this example, the force estimated to be applied to the fluid particle may be calculated using general physical formulae, e.g., based on the known initial position of the fluid particle, the relocated position of the fluid particle, and a moving velocity of the fluid particle.

For example, modeling may be performed to enable the deformable object to float on the fluid particle by the reaction force that is applied to the deformable object. Here, this reaction force will hereinafter also be referred to as an action force. Thus, the modeling apparatus may store this action force applied to the deformable object in or for grid points of the cell that includes the redefined position 533 of the fluid particle. The action force applied to the deformable object may be differently stored in or for each grid point based on a distance from the corresponding grid point to the corresponding fluid particle. For example, a smallest value may be assigned to the grid point 573 disposed at a longest distance from the relocated fluid particle, and a greatest value may be assigned to the grid point 572 disposed at a shortest distance from the relocated fluid particle. In addition, values greater than the value assigned to the grid point 573 and smaller than the value assigned to the grid point 572 may be assigned to grid points 571 and 574. An action force assigned to each grid point may be expressed using a length or size of an arrow, or stored as respective vectors, for example. The length or size of the example arrow or vector may be expressed or stored so as to be relatively great at the grid point 572 to which the greatest action force is applied, and the length or size of the arrow or vector may be expressed or stored so as to be relatively small at the grid point 573 to which the smallest action force is applied. Here, in one or more embodiments, though the cells may be discussed as having four grid points and uniform sizes, alternate cell shapes and grid or cell configurations are also available.

The modeling apparatus may store the action force applied to the deformable object in or for the grid points of the cell that includes the corresponding fluid particle using the method described above, as only examples. The modeling apparatus may also, or alternatively, store the action force applied from the deformable object in or for the grid points of the example cell. Thus, the modeling apparatus may model an outward collision between a fluid and a deformable object through operations 510 and 530, e.g., resulting in the relocation of the fluid particle, and may model an action force applied between the fluid and the deformable object through operation 550.

Figure 6:
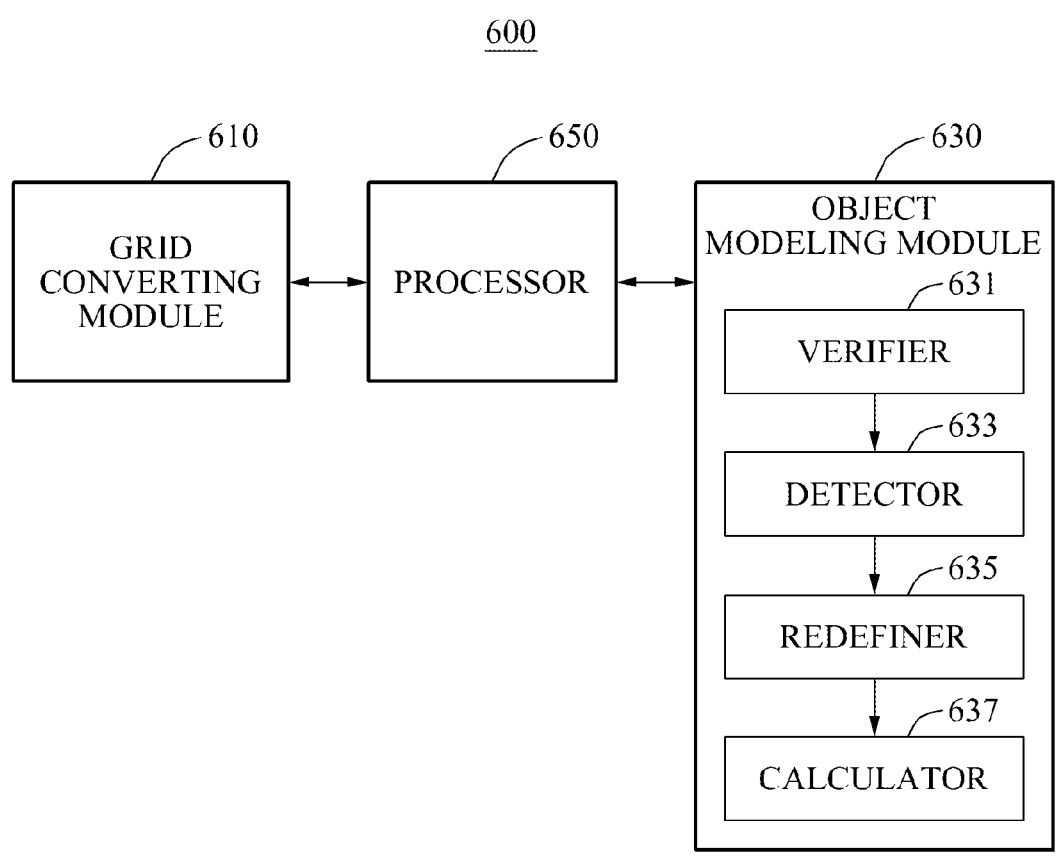
FIG. 6 illustrates an apparatus for modeling objects, according to one or more embodiments.

FIG. 6 illustrates an apparatus 600 for modeling objects, according to one or more embodiments.

Referring to FIG. 6, the modeling apparatus 600 may include a grid converting module 610, an object modeling module 630, and a processor 650, for example.

The grid converting module 610 may detect an adjacent area between a first object modeled using particles and a second object modeled using particles, and define a grid with respect to the adjacent area.

The grid converting module 610 may extract distance values between the contour in the adjacent area and the grid points, and store the extracted distance values in or for the grid points of the grid.

The object modeling module 630 may calculate an action force between the first object and the second object in the adjacent area based on information stored in or for the grid points of the grid, and model the first object and the second object based on the calculated action force. The object modeling module 630 may include a verifier 631, a detector 633, a redefiner 635, and a calculator 637. The verifier 631 may determine whether collisions occur between the particles of the first object and the particles of the second object in the adjacent area. The detector 633 may detect the particular colliding particles of the first object, among the particles of the first object and the particles of the second object in the adjacent area, based on a result of the collision determination. The redefiner 635 may redefine a position of the detected colliding particle of the first object. The redefiner 635 may calculate a moving direction and a shortest moving distance of the colliding particle of the first object, e.g., based on gradients and distance values stored in or for grid points corresponding to the cell that includes the detected colliding particle of the first object, so that the colliding particle of the first object may not penetrate through the second object. The redefiner 635 may relocate the colliding particle of the first object based on the calculated moving direction and the calculated shortest moving distance.

The calculator 637 may calculate an action force applied by the first object to the second object in response to the collisions, based on the redefined position of the colliding particle of the first object. For example, the calculator 637 may calculate a force estimated to be applied by the second object to the colliding particle of the first object at the redefined position of the colliding particle of the first object, and calculate the action force applied to the second object in response to the collisions based on the calculated force. The calculator 637 may store the calculated action force in or for grid points of the grid corresponding to the cell that includes the colliding particle of the first object.

The processor 650 may control the grid converting module 610 and the object modeling module 630. In one or more embodiments, the object modeling module 630 may be configured to be divided into a module to model a deformable object and a module to model a fluid. This will be described in greater detail with reference to FIG. 9. In addition, the processor may be one or more processing devices, processor, or computer configured to implement the controlling of the grid converting module 610 and the object modeling module 630, which may both also be implemented as configured processing elements of the processor 650. Similarly, the verifier, detector, redefine, and calculator may be one or more processing devices, processor, or computer configured to implement the described operations.

Figure 7:
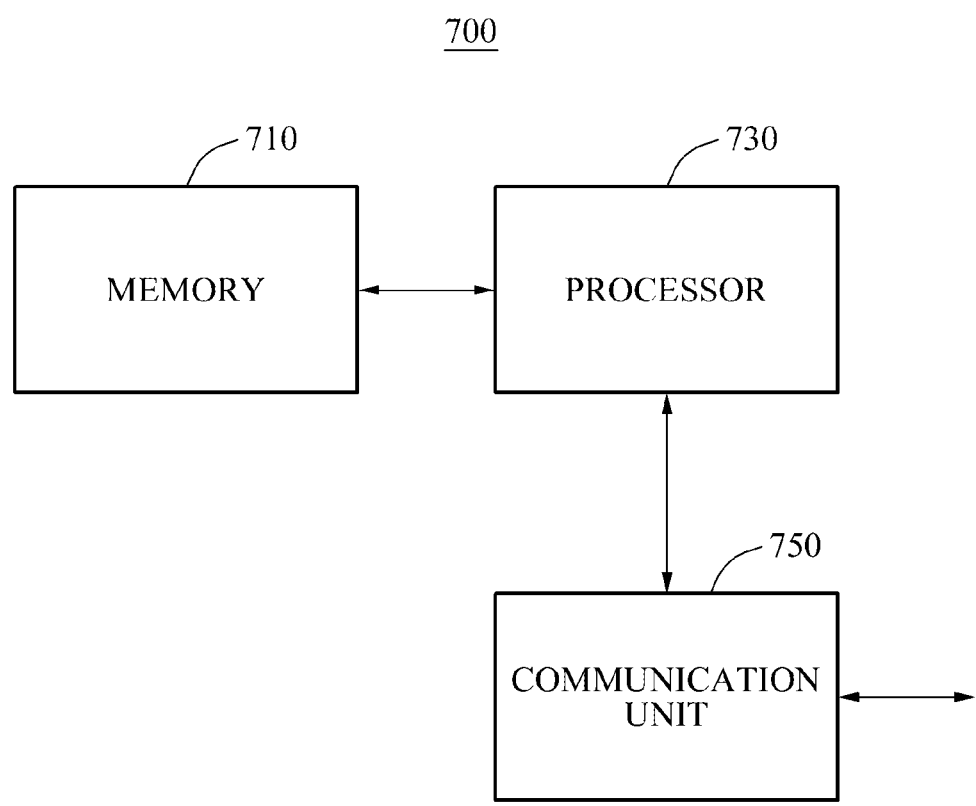
FIG. 7 illustrates an apparatus for modeling objects, according to one or more embodiments.

FIG. 7 illustrates an apparatus 700 for modeling objects, according to one or more embodiments.

Referring to FIG. 7, the modeling apparatus 700 may include a memory 710, a processor 730, and a communication unit 750, for example.

The memory 710 may record computer readable code or a program designed to control an operation of the modeling apparatus 700.

The processor 730 may execute the computer readable code recorded or stored by the memory 710. At least one processor 730 may be provided. The computer readable code may control the processor 730 to detect an adjacent area between an input first object modeled using particles and an input second object modeled using particles, and define a grid including a plurality of cells with respect to the adjacent area. The computer readable code may control the processor 730 to model the first object and the second object based on a determined action force between the first object and the second object in the adjacent area. The action force may be calculated, e.g., by the processor 730, based on information stored in or for grid points of the grid, such as in memory 710. The first and second objects may be modeled at positions within and outside of the adjacent area. The processor 730 may include one or more processing devices, a processor, or a specialized computer, and the computer readable code may further include instructions or program(s) designed to control the processor 730 to implement the modeling of the first and second objects.

The communication unit 750 may transmit and receive information to be used for the operation of the modeling apparatus 700, including outputting a resultant modeled first object and second object that are modeled by the processor 730 based on the computer readable code.

Figure 8:
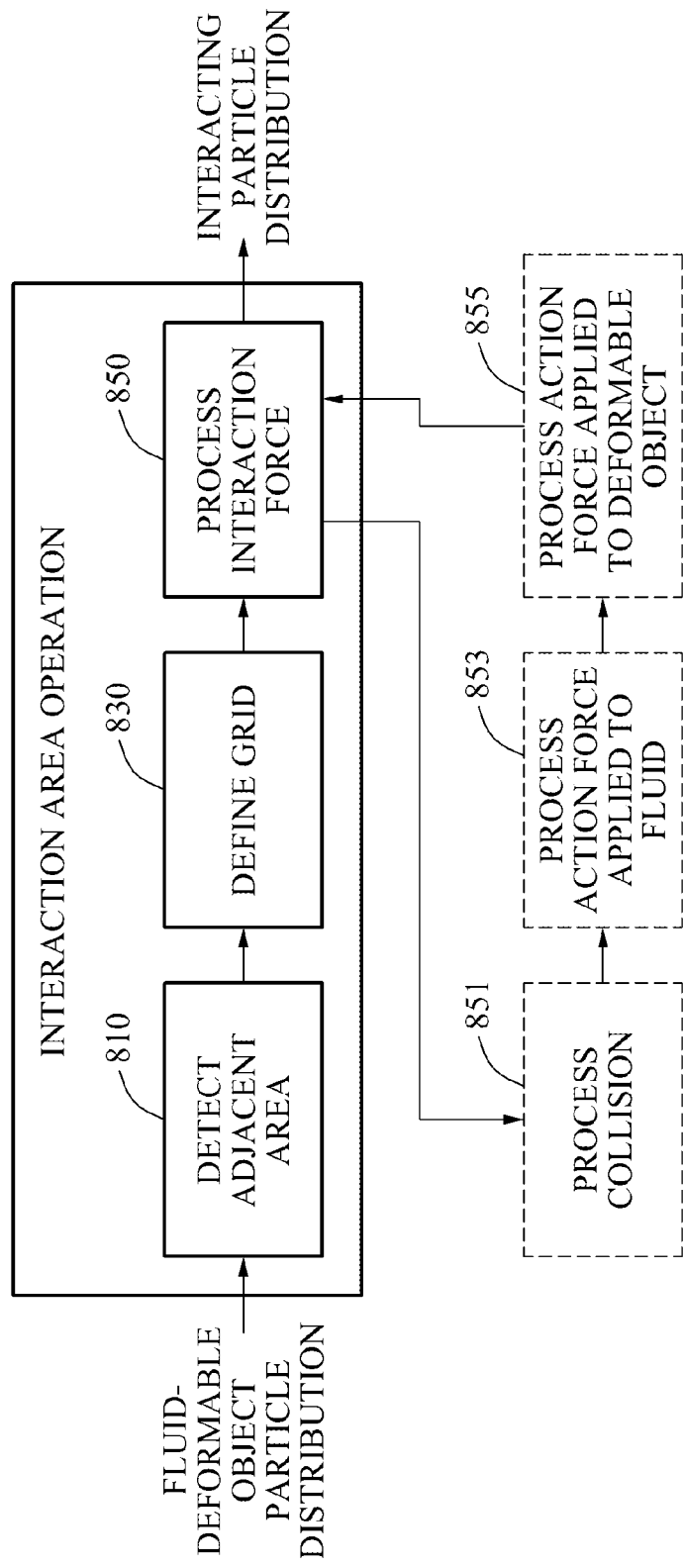
FIG. 8 illustrates a method of modeling objects, according to one or more embodiments.

FIG. 8 illustrates a method of modeling objects, according to one or more embodiments.

Referring to FIG. 8, a process of obtaining a distribution of interacting particles through an operation with respect to an interaction area between a fluid and a deformable object, in a case in which particles of the fluid and particles of the deformable object are distributed, is illustrated. The operation with respect to the interaction area may be performed through the following process.

A modeling apparatus may detect an adjacent area between the fluid and the deformable object, in operation 810, and define a grid with respect to the adjacent area, in operation 830. The modeling apparatus may process an interaction/action force between the fluid and the deformable object in the adjacent area based on information stored in or for grid points of the grid, in operation 850.

As only an example, a process of processing the interaction force between the fluid and the deformable object may be performed as follows. When a collision occurs between a particle of the first object and a particle of the second object, the modeling apparatus may process the collision by moving the particle of the first object to a position at which the particle of the first object does not penetrate through the second object, in operation 851, e.g., using the method described through operations 510 and 530 of FIG. 5.

The modeling apparatus may process an action force applied to the fluid, as the first object, in operation 853. The modeling apparatus may then process an action force applied to the deformable object, as the second object, based on a result of the processing of the action force applied to the fluid, in operation 855. The modeling apparatus may process the action force applied to the fluid using a fluid modeling module, and process the action force applied to the deformable object using a deformable object modeling module. The fluid modeling module may also model the remainder of the fluid beyond the adjacent area based on the processing of the action force applied to the fluid, and the deformable object modeling module may also model the remainder of the deformable object beyond the adjacent area based on the processing of the action force applied to the deformable object.

Figure 9:
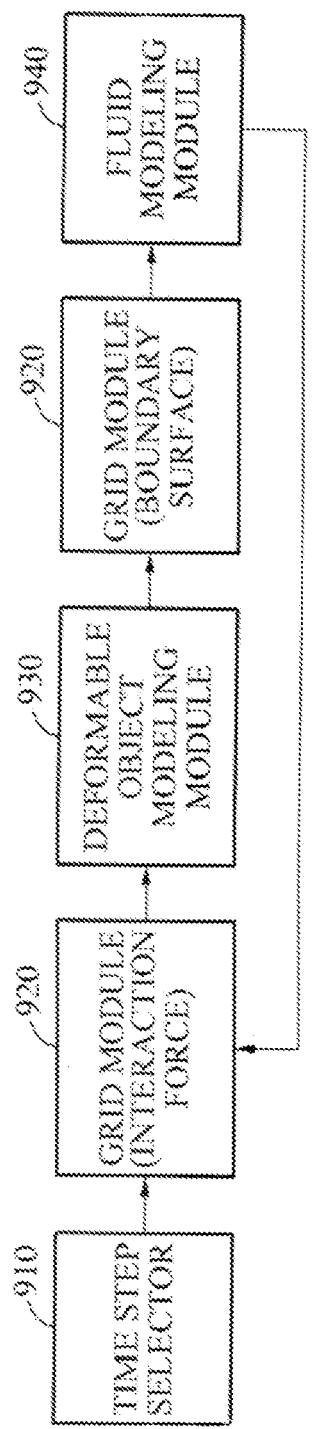
FIG. 9 illustrates a process of processing an adjacent area and an action force based on an operating sequence of multiple modeling modules in an apparatus for modeling an object, according to one or more embodiments.

FIG. 9 illustrates a process of processing an adjacent area and an action force based on an operating sequence of multiple modeling modules in an apparatus for modeling an object, according to one or more embodiments.

Referring to FIG. 9, the modeling apparatus may include a time step selector 910, a grid module 920, a deformable object modeling module 930, and a fluid modeling module 940, for example.

The time step selector 910 may select a time step to model interactions between fluid particles and deformable object particles. For example, when "1" period during which modeling is to be performed corresponds to "1" second and a first interaction modeling operation between a deformable object and a fluid operation is performed in that period, the modeling apparatus may progressively model an interaction between the deformable object and the fluid in respective "0.5"-second units or "0.3"-second units of the 1 second period, e.g., rather than modeling the interaction between the deformable object and the fluid during the "1" second for the same amount of time. Here, the time step may correspond to a process of determining a number of steps into which "1" period is to be divided, similar to dividing the "1" period by a "0.5"-second unit or "0.3"-second unit. The time step may be selected to be an appropriate value by the time step selector 910 or a user of the modeling apparatus, e.g., so as to allot sufficient time to each of the respective modeling of the deformable object and the fluid before a next iterative processing in the modeling of the interaction between the deformable object and the fluid, with potentially several or many repetitions or iterations being performed. Here, depending on embodiment and/or determination by the time step selector 910, the time steps for the respective modeling of the deformable object and the fluid may be different or they may be the same.

Thus, the time step selector 910 may separately set time steps for the deformable object modeling module 930 and the fluid modeling module 940. The modeling apparatus may select, through the time step selector 910, the time allotted to model motions of fluid particles or deformable object particles.

The grid module 920 may receive information from the fluid modeling module 940 based on the time step selected by the time step selector 910. As only an example, the received information may include action forces respectively applied to the fluid particles and final velocities of the fluid particles. The action forces applied to the fluid particles may also be referred to as constrained forces. Here, in an embodiment, for an initial operation of the grid module 920, for example, information provided by the fluid modeling module 940, such as initial action forces and final velocities, may be based on an initialization process performed by the fluid modeling module 940, such as discussed below with regard to FIG. 12.

The grid module 920 may process the information received from the fluid modeling module 940 and provide the processed information to the deformable object modeling module 930. The information processed by the grid module 920 and provided to the deformable object modeling module 930 may be interaction forces between the deformable object and fluid particles included in a fluid field. The interaction forces may refer to action forces of the fluid particles with respect to the deformable object, for example, reaction forces and drag forces of the fluid particles with respect to the deformable object.

The deformable object modeling module 930 may reflect the interaction forces received from the grid module 920 in a shape model with respect to the deformable object. The deformable object modeling module 930 may generate shape information of the deformable object from the shape model in which the interaction forces are reflected. The deformable object modeling module 930 may then provide the shape information of the deformable object back to the grid module 920. Similar to above, in an embodiment, the deformable object modeling module 930 may perform an initialization process, such as to prepare for such interaction forces provided by the grid module 920 for modeling of the deformable object based on the received interaction forces, as only an example.

The grid module 920 may then determine information on a contour of the deformable object from the shape information of the deformable object. The grid module 920 may calculate action forces of the fluid particles with respect to the deformable object based on the shape information. The grid module 920 may transmit the shape information to the fluid modeling module 940.

The fluid modeling module 940 may calculate final velocities of the fluid particles and constrained forces applied to the fluid particles in response to any determined collisions between the deformable object and the fluid particles based on the shape information. The fluid modeling module 940 may then provide the constrained forces applied to the fluid particles and the final velocities of the fluid particles to the grid module 920 again.

In one or more embodiments, by feeding back information stored in or for the grid module 920 by a counterpart modeling module, for example, the deformable object modeling module 930 in case of the fluid, and the fluid modeling module 940 in case of the deformable object, and reflecting the feedback information in modeling of its own particles, the interaction between the deformable object and the fluid may be processed in real time. In this way, modeling performed by the deformable object modeling module 930 can be reflected in the grid information that is available to the fluid modeling module 940, and the modeling performed by the fluid modeling module 940 can be reflected in the grid information that is available to the deformable object modeling module 930. Thus, in one or more embodiments, the grid module 920 may enable grid based modeling of the adjacent area by the deformable object modeling module 930 and the fluid modeling module 940 to interact with particle or penalty based modeling, as only an example, respectively performed by the deformable object modeling module 930 and the fluid modeling module 940 for the deformable object and fluid field beyond the adjacent area.

By processing the interaction between the deformable object and fluid, in one or more embodiments special effects in a video requiring high-quality realistic image reproduction are further enabled, and realistic modeling of a fluid and a deformable object mixed with the fluid in a game or mobile user interface (UI) fields, e.g., including real-time processing, are enabled.

Figure 10:
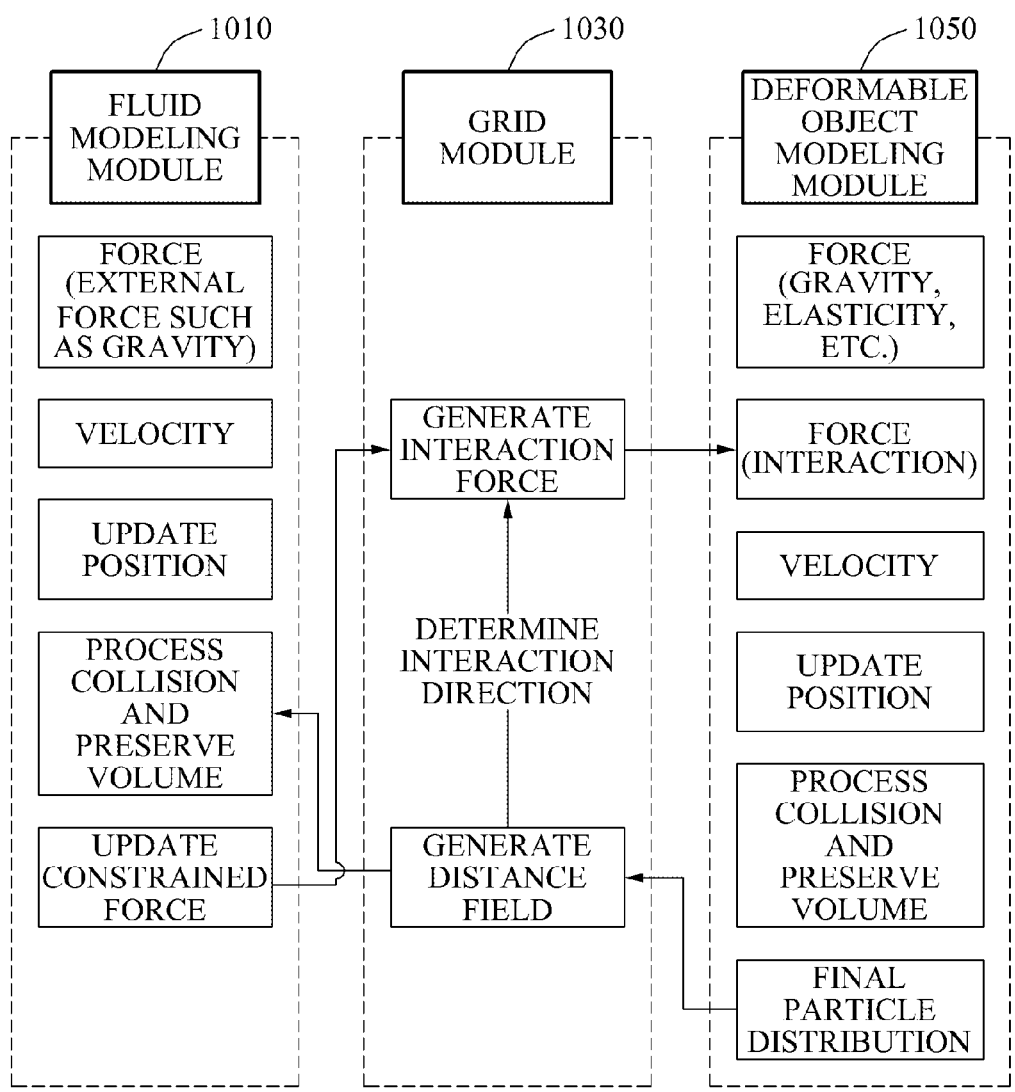
FIG. 10 illustrates a process of processing an interaction between a fluid and a deformable object through relay of a grid module in an apparatus for modeling objects, according to one or more embodiments.

FIG. 10 illustrates a process of processing an interaction between a fluid and a deformable object through relay of a grid module in an apparatus for modeling objects, according to one or more embodiments.

Referring to FIG. 10, a fluid modeling module 1010, a grid module 1030, and a deformable object modeling module 1050 are illustrated.

The fluid modeling module 1010 may process an external force, for example, gravity, when modeling the fluid field, model a viscosity of the fluid field, and update respective positions of the fluid particles. The fluid modeling module 1010 may model fluid particles by determining whether each fluid particle included in the fluid field collides with the deformable object, and whether a volume or density of the fluid particles satisfies volume preservation conditions. For example, in an embodiment, modeling may be based on the assumption that each fluid particle included in the fluid field collides with the deformable object and the volume of the fluid particles at a time of the collision satisfies the volume preservation conditions. The fluid modeling module 1010 may calculate constrained forces applied to the fluid particles and final velocities of the fluid particles. The fluid modeling module 1010 may calculate the constrained forces applied to the fluid particles by comparing forces applied to the fluid particles when collisions and the volume preservation conditions are absent to forces applied to the fluid particles when collisions and the volume preservation conditions are present. The fluid modeling module 1010 may also consider collisions that occur in the fluid field, e.g., between fluid particles, beyond the adjacent area. The fluid modeling module 1010 may provide information on the calculated constrained forces and the final velocities of the fluid particles to the grid module 1030.

The grid module 1030 may help the fluid modeling module 1010 and the deformable object modeling module 1050 to implicitly recognize the presence of the counterpart modeling module. The grid module 1030 may provide action forces of the fluid particles to the deformable object modeling module 1050, and provide shape information of the deformable object to the fluid modeling module 1010. The action forces of the fluid particles may include reaction forces and drag forces of the fluid particles with respect to the deformable object. The grid module 1030 may calculate the action forces based on the constrained forces and the final velocities of the fluid particles when the fluid particle and the deformable object are determined to be sufficiently adjacent to each other, e.g., within a predetermined distance from each other.

The grid module 1030 may enable each of the fluid modeling module 1010 and the deformable object modeling module 1050 to derive physically correct interaction results, such as according to Newton's third law, by transmitting the shape information of the deformable object to the fluid particles, and transmitting interactions and resistances applied to the fluid to a shape model of the deformable object. Differently, for example, if only particle modeling, also referred to as penalty force based interaction modeling, is performed by a fluid modeler for an interaction between the deformable object and the fluid field, the modeled interactions may not be physically correct or follow physical laws as the particle modeling merely applies repulsive force based collision avoidance that may not be physically accurate, and collision avoidance would also fail when an external force stronger than the virtual repulsive forces are applied.

Again, the grid module 1030 may perform an operation on at least an area in which the fluid and the deformable object are adjacent to each other to correctly transmit interactions. In one or more embodiments, the grid module 1030 may act to maintain simulation information left in a background grid respectively by the deformable object modeling module 1050 and the fluid modeling module 1010, which may each respectively be separately and simultaneously performing their respective modeling/simulation operations. Here, in an embodiment, because the deformable object modeling module 1050 and the fluid modeling module 1010 are separately performing the respective modeling of the deformable object and the fluid, constraint conditions, such as volume conservation, may be achieved.

The deformable object modeling module 1050 may model gravity, for example, and an elasticity, similar to the fluid, and may additionally reflect forces generated in the interaction/adjacent area by referring to the grid module 1030. The deformable object modeling module 1050 may determine a final position of the shape model by applying an action force to the shape model in a distance field. In this example, the action force may be obtained by considering the action forces of the fluid particles with respect to the deformable object, and dampening may be applied to the velocity field, e.g., for effects by frictional forces and resistances by the fluid particles, all of which may be reflected in the final positions of the deformable object. Thus, the deformable object modeling module 1050 may generate shape information of the deformable object so that the shape model and any other obstacles, excluding the fluid particles, may satisfy the volume preservation conditions in view of the collisions between the deformable object and the fluid particles at the final position of the shape model. In this example, the action forces of the fluid particles with respect to the deformable object may be reflected in the shape model of the deformable object. The referred to obstacles may be other objects in the overall area or scene that includes the deformable object and the fluid. For example, an obstacle may be another deformable object distinct from the aforementioned deformable object and fluid. The deformable object modeling module 1050 may transmit the shape information to the grid module 1030, for example, as level set information, as discussed above.

As noted above, and as only an example, in one or more embodiments, the fluid modeling module 1010 and the deformable object modeling module 1050 may be configured separately to achieve constraints, for example, volume preservation, required to model the particles of the deformable object and particles of the fluid separately.

In addition, the fluid modeling module 1010 and the deformable object modeling module 1050 may perform respective modeling independently, and process the interaction area between the deformable object and the fluid through the grid module 1030 in an integrated manner.

Figure 11:
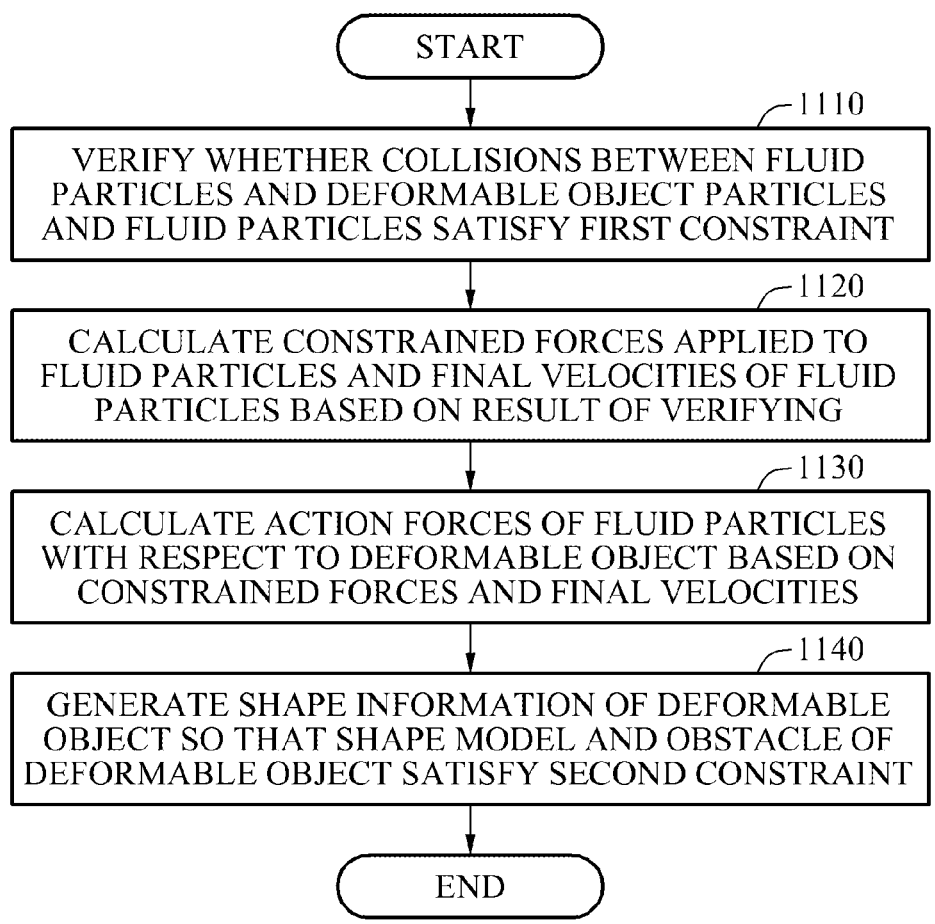
FIG. 11 illustrates an operating method of an apparatus for modeling objects, according to one or more embodiments.

FIG. 11 illustrates an operating method of an apparatus for modeling objects, according to one or more embodiments.

Referring to FIG. 11, in operation 1110, the modeling apparatus may determine whether collisions between deformable object particles and fluid particles included in a fluid field satisfy volume preservation conditions corresponding to a first constraint.

In operation 1120, the modeling apparatus may calculate constrained forces applied to the fluid particles and final velocities of the fluid particles based on a result of the collision determination. When the fluid particles collide with the deformable object particles, the modeling apparatus may relocate the fluid particles to final positions where the fluid particles do not penetrate through the deformable object. The modeling apparatus may perform modeling so that the fluid particles may satisfy the volume preservation conditions at the final positions, and calculate the constrained forces applied to the fluid particles and the final velocities of the fluid particles. In addition, the modeling apparatus may calculate the constrained forces and the final velocities of the fluid particles based on shape information.

In operation 1130, the modeling apparatus may calculate action forces of the fluid particles with respect to the deformable object based on the calculated constrained forces and the calculated final velocities. The action forces may include reaction forces and drag forces. In operation 1130, the modeling apparatus may calculate reaction forces of the fluid particles with respect to the deformable object based on the constrained forces. In this example, the reaction forces may be calculated based on the shape information. The modeling apparatus may calculate the drag forces of the fluid particles with respect to the deformable object based on the final velocities at the final positions of the fluid particles in which the constrained forces are reflected.

In addition, the modeling apparatus may determine whether a fluid particle and a deformable object particle are adjacent to each other within a preset distance, and calculate the action forces based on a result of the adjacency determination.

In operation 1140, the modeling apparatus may generate shape information of the deformable object so that a shape model of the deformable object and any obstacles excluding the fluid particles may satisfy the volume preservation conditions. The action forces of the fluid particles with respect to the deformable object may be reflected in the shape model of the deformable object.

In operation 1140, the modeling apparatus may apply the action forces to the shape model, and determine a final position of the shape model based on a result of this applying. The modeling apparatus may generate the shape information of the deformable object so that the shape model and any obstacles may satisfy the volume preservation conditions at the final position of the shape model.

Figure 12:
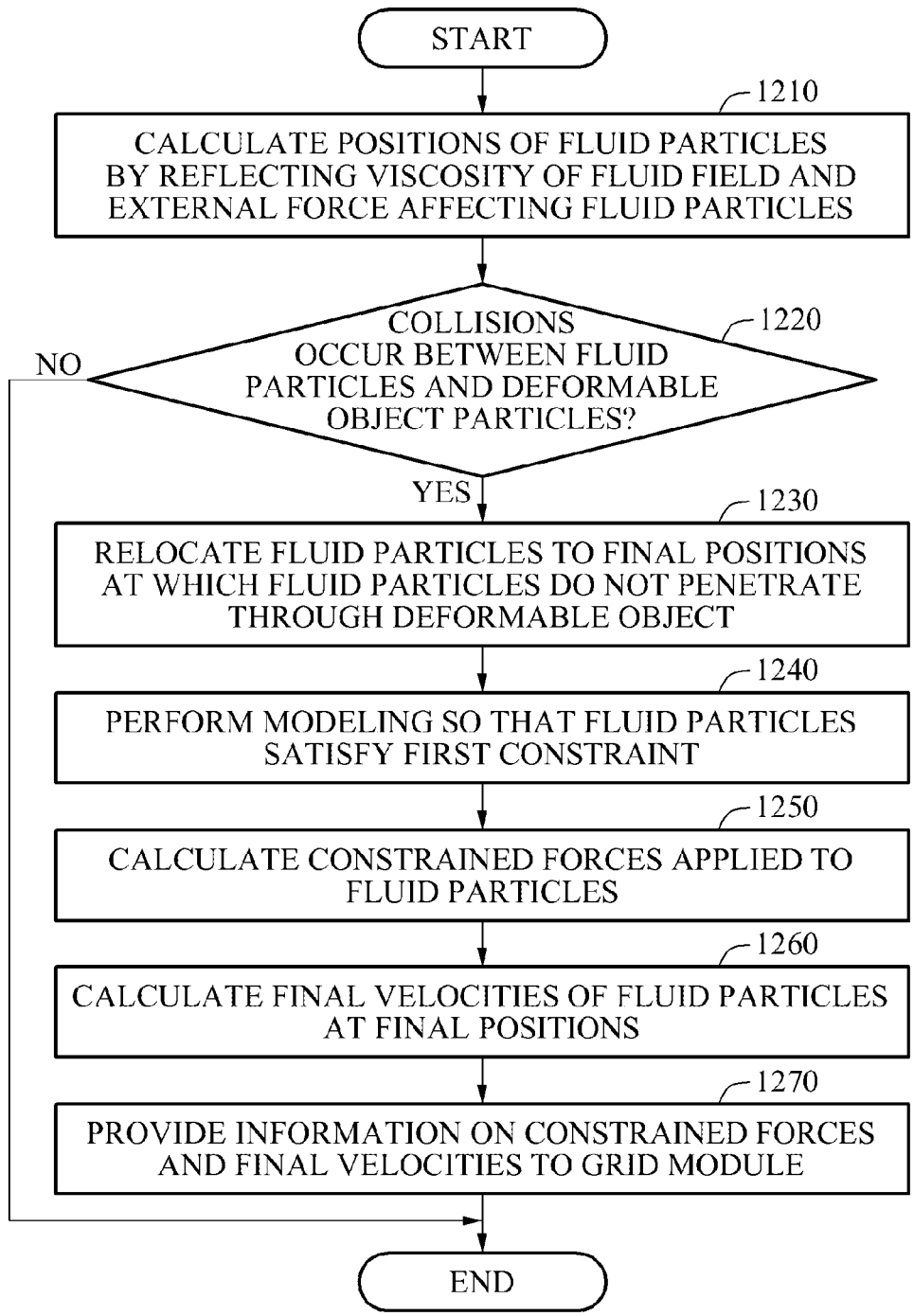
FIG. 12 illustrates an operating method of a fluid modeling module in an apparatus for modeling objects, according to one or more embodiments.

FIG. 12 illustrates an operating method of a fluid modeling module in an apparatus for modeling objects, according to one or more embodiments.

Referring to FIG. 12, in operation 1210, the fluid modeling module may calculate positions of fluid particles of a fluid field by reflecting a viscosity of the fluid field and an external force affecting the fluid particles in the fluid field. In operation 1210, the fluid modeling module may calculate momentum equations among the fluid particles. For example, the fluid modeling module may calculate a momentum equation with respect to a first particle of the fluid field based on a second particle of the fluid field neighboring the first particle, and calculate densities, external forces, and viscosities with respect to all particles including the first particle and the second particle. The fluid modeling module may calculate a variation that satisfies an incompressible condition with respect to each of the first particle and the second particle based on a result of calculating the momentum equation. The incompressible condition may refer to an invariant condition of an internal volume of the fluid, and may enable highly precise modeling of a contour through an interaction between the fluid and the deformable object and control of an inflow and outflow rate among particles to which particle velocities are applied in a predetermined fluid field. The fluid modeling module may obtain divergences of the respective fluid particles in the fluid field, and satisfy the incompressible condition by controlling the divergences to be "0". The fluid modeling module may calculate positions of the fluid particles based on the calculated variation.

Prior to operation 1210, the fluid modeling module may initialize particles to be used to model the fluid. During the initialization process, the modeling apparatus may initialize information on masses, densities, velocities, and positions of the particles corresponding to the fluid in a predetermined space or area.

In operation 1220, the fluid modeling module may determine whether collisions occur between the deformable object and fluid particles included in the fluid field.

When occurrence of the collisions is determined in operation 1220, the fluid modeling module may relocate the colliding fluid particles to final positions where the fluid particles do not penetrate through the deformable object, in operation 1230. In operation 1240, the fluid modeling module may perform modeling so that the fluid particles may satisfy a first constraint, for example, volume preservation conditions, at the final positions. The fluid modeling module may calculate constrained forces applied to the fluid particles in response to the collisions, in operation 1250, and calculate final velocities of the fluid particles at the final positions, in operation 1260. The fluid modeling module may calculate the constrained forces and the final velocities of the fluid particles based on shape information of the deformable object, e.g., received from a grid module, as discussed above. In operation 1270, the fluid modeling module may provide information on the constrained forces applied to the fluid particles and the final velocities of the fluid particles to the grid module.

When occurrence of the collisions is not found in operation 1220, the fluid modeling module may terminate a current modeling operation, or merely provide the positions of the fluid particles calculated in operation 1210 to the grid module.

Figure 13:
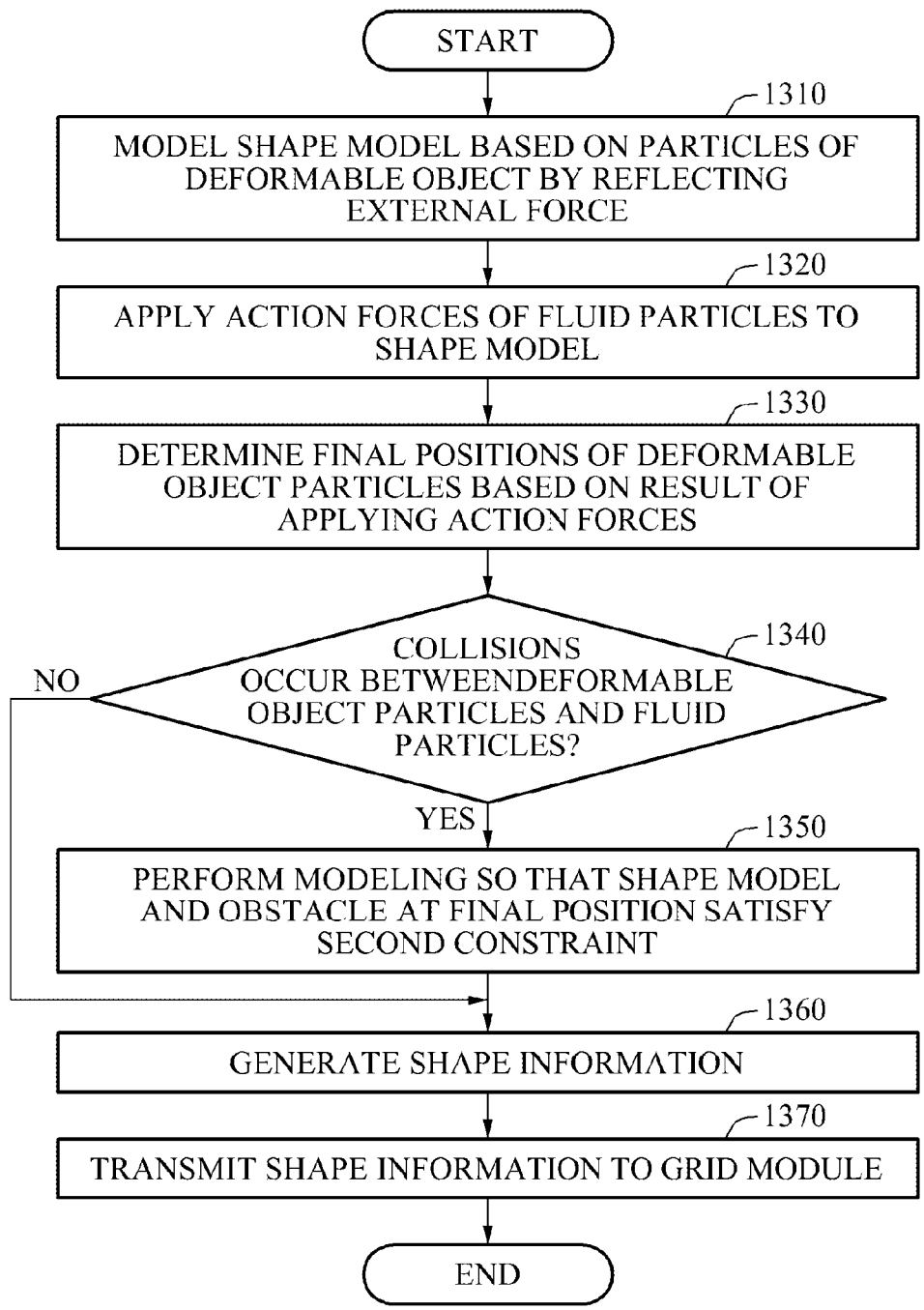
FIG. 13 illustrates an operating method of a deformable object modeling module in an apparatus for modeling objects, according to one or more embodiments.

FIG. 13 illustrates an operating method of a deformable object modeling module in an apparatus for modeling objects, according to one or more embodiments.

Referring to FIG. 13, in operation 1310, the deformable object modeling module may model a shape model based on particles of a deformable object by reflecting an external force. In operation 1320, the deformable object modeling module may apply action forces of fluid particles with respect to the deformable object to the modeled shape model. In operation 1330, the deformable object modeling module may determine a final position of the shape model based on a result of the applying.

In operation 1340, the deformable object modeling module may determine whether collisions occur between the deformable object and the fluid particles.

When occurrence of the collisions is determined in operation 1340, the deformable object modeling module may perform modeling so that the shape model and any obstacles may satisfy a second constraint at the final position of the shape model, in operation 1350. In operation 1360, the deformable object modeling module may generate shape information on the shape model of the deformable object modeled in operation 1350. In operation 1370, the deformable object modeling module may transmit the generated shape information to a grid module, for example.

When occurrence of the collisions is not found in operation 1340, the deformable object modeling module may generate shape information on the shape model, in operation 1360, and transmit the generated shape information to the grid module, in operation 1370.

Figure 14:
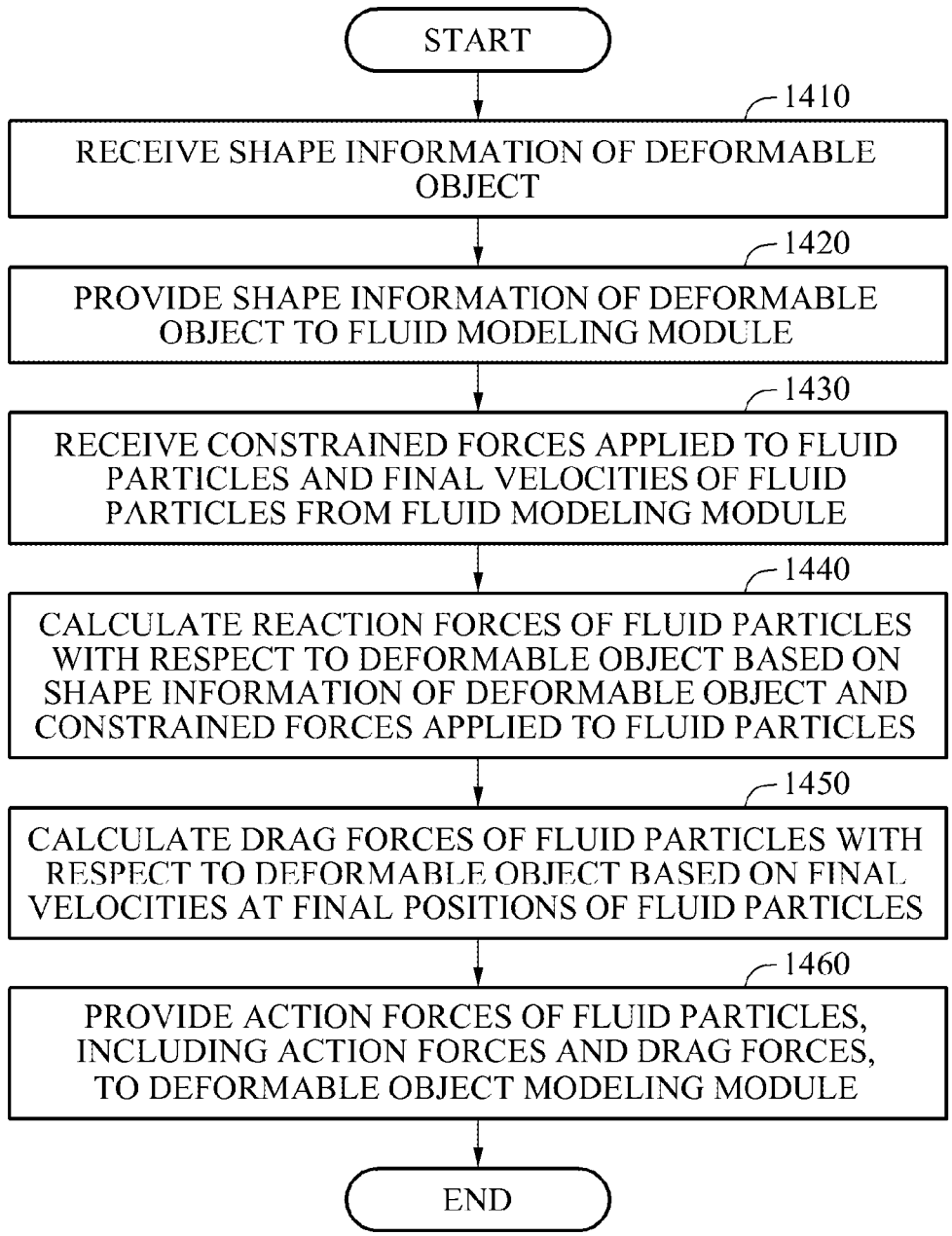
FIG. 14 illustrates an operating method of a grid module in an apparatus for modeling objects, according to one or more embodiments.

FIG. 14 illustrates an operating method of a grid module in an apparatus for modeling objects, according to one or more embodiments.

Referring to FIG. 14, in operation 1410, the grid module may receive shape information of a deformable object from a deformable object modeling module. In operation 1420, the grid module may provide the shape information of the deformable object to a fluid modeling module. In operation 1430, the grid module may receive constrained forces applied to fluid particles and final velocities of the fluid particles from the fluid modeling module. In operation 1440, the grid module may calculate reaction forces of the fluid particles with respect to the deformable object based on the shape information of the deformable object and the constrained forces applied to the fluid particles. In operation 1450, the grid module may calculate drag forces of the fluid particles with respect to the deformable object based on the final velocities at the final positions of the fluid particles. In operation 1460, the grid module may provide action forces of the fluid particles including the reaction forces and the drag forces to the deformable object modeling module.

The apparatuses, units, modules, devices, and other components illustrated in FIGS. 6-7 for example, that may perform operations described herein with respect to FIGS. 1-5 and 8-14, for example, are implemented by hardware components. Examples of hardware components include controllers, sensors, memory, drivers, and any other electronic components known to one of ordinary skill in the art. In one example, the hardware components are implemented by one or more processing devices, or processors, or computers. A processing device, processor, or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processing device, processor, or computer includes, or is connected to, one or more memories storing computer readable code, instructions, or software that are executed by the processing device, processor, or computer and that may control the processing device, processor, or computer to implement one or more methods described herein. Hardware components implemented by a processing device, processor, or computer execute code, instructions, or software, such as an operating system (OS) and one or more software applications that run on the OS, to perform the operations described herein with respect to FIGS. 1-5 and 8-14, as only an example. The hardware components also access, manipulate, process, create, and store data in response to execution of the instructions or software. For simplicity, the singular term "processing device", "processor", or "computer" may be used in the description of the examples described herein, but in other examples multiple processing devices, processors, or computers are used, or a processing device, processor, or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, remote processing environments, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-5 and 8-14 that perform the operations described herein may be performed by a processing device, processor, or a computer as described above executing computer readable code, instructions, or software to perform the operations described herein.

Computer readable code, instructions, or software to control a processing device, processor, or computer to implement the hardware components and perform the methods as described above may be written as computer programs, code segments, instructions or any combination thereof, for individually or collectively instructing or configuring the processing device, processor, or computer to operate as a machine or special-purpose computer to perform the operations performed by the hardware components and the methods as described above. In one example, the computer readable code, instructions, or software include machine code that is directly executed by the processing device, processor, or computer, such as machine code produced by a compiler. In another example, the computer readable code, instructions, or software include higher-level code that is executed by the processing device, processor, or computer using an interpreter. Based on the disclosure herein, and after an understanding of the same, programmers of ordinary skill in the art can readily write the computer readable code, instructions, or software based on the block diagrams and the flow charts illustrated in the drawings and the corresponding descriptions in the specification, which disclose algorithms for performing the operations performed by the hardware components and the methods as described above.

The computer readable code, instructions, or software to control a processing device, processor, or computer to implement the hardware components, such as discussed in any of FIGS. 6-7, and perform the methods as described above in any of FIGS. 1-5 and 8-14, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the computer readable code, instructions, or software and any associated data, data files, and data structures in a non-transitory manner and providing the computer readable code, instructions, or software and any associated data, data files, and data structures to a processing device, processor, or computer so that the processing device, processor, or computer can execute the instructions. In one example, the computer readable code, instructions, or software and any associated data, data files, and data structures are distributed over network-coupled computer systems so that the instructions and software and any associated data, data files, and data structures are stored, accessed, and executed in a distributed fashion by the processing device, processor, or computer.

As a non-exhaustive example only, an electronic device embodiment herein may include a mobile device, such as a cellular phone, a smart phone, a wearable smart device, a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is not limited by the detailed description, but further supported by the claims and their equivalents, and all variations within the scope of the claims and their equivalents are to be construed as being included in the disclosure.

What is claimed is:

1. A computer implemented method of modeling objects, the method comprising:
   detecting, using a computer, an adjacent area shared by modeled particles of a first object and modeled particles of a second object, where one or more particles of the first object are adjacent to one or more particles of the second object in the adjacent area;
   defining, using the computer, a grid with respect to the adjacent area;
   calculating, using the computer, an action force between the first object and the second object in the adjacent area based on information stored for grid points of the grid; and
   modeling, using the computer, the first object and the second object based on the calculated action force.

2. The method of claim 1, wherein the defining of the grid comprises:
   extracting distance values between a contour of the first object or the second object in the adjacent area and the grid points of the grid; and
   storing the extracted distance values in a memory for each of the grid points.

3. The method of claim 1, wherein the calculating comprises:
   determining whether collisions occur between particles of the first object in the adjacent area and particles of the second object in the adjacent area; and
   calculating action forces between the particles of the first object in the adjacent area and the particles of the second object in the adjacent area based on a result of the determining of whether the collisions occur.

4. The method of claim 3, wherein the determining of whether the collisions occur comprises determining whether the collisions occur based on distance values stored in a memory for corresponding grid points adjacent to respective positions of the particles of the first object in the adjacent area.

5. The method of claim 4, wherein the determining of whether the collisions occur further comprises determining whether the particles of the first object satisfy volume preservation conditions.

6. The method of claim 3, wherein the calculating of the action forces between the particles of the first object in the adjacent area and the particles of the second object in the adjacent area comprises:
   detecting a colliding particle of the first object that collides with the second object in the adjacent area, when occurrence of the collisions is determined;
   redefining a position of the detected colliding particle of the first object; and
   calculating an action force applied by the first object to the second object in response to the redefining of the position of the detected colliding particle of the first object.

7. The method of claim 6, wherein the redefining of the position of the detected colliding particle of the first object comprises redefining the position of the detected colliding particle of the first object to a position where the colliding particle of the first object does not penetrate through the second object.

8. The method of claim 7, wherein the redefining of the position of the detected colliding particle of the first object further comprises:
   calculating a moving direction and a shortest moving distance, for the redefining of the position of the detected colliding particle of the first object, based on gradients and distance values stored in a memory for grid points corresponding to a cell of the grid that includes the detected colliding particle of the first object, and so that the colliding particle of the first object does not penetrate through the second object; and relocating the detected colliding particle of the first object based on the calculated moving direction and the calculated shortest moving distance.

9. The method of claim 8, further comprising:
calculating a moving velocity of the detected colliding particle of the first object based on the distance values stored in the memory for the corresponding grid points and the calculated shortest moving distance; and
storing the calculated moving velocity in the memory for the corresponding grid points.

10. The method of claim 6, wherein the calculating of the action force applied by the first object comprises:
calculating a force estimated to be applied by the second object to the detected colliding particle of the first object at the redefined position; and
calculating the action force applied by the first object to the second object in response to the redefining of the position of the detected colliding particle of the first object, based on the calculated force estimated to be applied by the second object.

11. The method of claim 10, further comprising:
storing the calculated action force in the memory for grid points of the grid corresponding to the redefined position of the detected colliding particle of the first object.

12. The method of claim 1, wherein the first object and the second object are heterogeneous.

13. The method of claim 12, wherein the first object corresponds to a fluid and the second object corresponds to a deformable object.

14. A non-transitory computer-readable medium comprising computer readable code to control at least one processing device to implement the method of claim 1.

15. An apparatus for modeling objects, the apparatus comprising:
a processor configured to perform a grid converting operation to detect an adjacent area sharing modeled particles of a first object and modeled particles of a second object and to define a grid with respect to the adjacent area, and configured to perform an object modelling operation to calculate an action force between the first object and the second object in the adjacent area based on information stored for grid points of the grid and to model the first object and the second object based on the calculated action force.

16. The apparatus of claim 15, wherein, to perform the grid converting operation, the processor is further configured to extract distance values between a contour of the first object or the second object in the adjacent area and the grid points of the grid, and to store the extracted distance values in a memory for each of the grid points of the grid.

17. The apparatus of claim 15, wherein, to perform the object modeling operation, the processor is further configured to:
determine whether collisions occur between particles of the first object in the adjacent area and particles of the second object in the adjacent area;
detect a colliding particle of the first object that collides with the second object in the adjacent area, based on a result of the determining of whether collisions occur;
redefine a position of the detected colliding particle of the first object; and
calculate an action force applied by the first object to the second object and in response to the redefining of the position of the detected colliding particle of the first object.

18. The apparatus of claim 17, wherein, to redefine the position of the detected colliding particle, the processor is further configured to calculate a moving direction and a shortest moving distance, for the redefining of the position of the detected colliding particle of the first object, based on gradients and distance values stored in a memory for grid points corresponding to a cell of the grid that includes the detected colliding particle of the first object, and so that the colliding particle of the first object does not penetrate through the second object, and is further configured to relocate the detected colliding particle of the first object based on the calculated moving direction and the calculated shortest moving distance.

19. The apparatus of claim 17, wherein, to calculate the action force applied by the first object to the second object, the processor is further configured to calculate a force estimated to be applied by the second object to the detected colliding particle of the first object at the redefined position, calculate the action force applied by the first object to the second object in response to the redefining of the position of the detected colliding particle of the first object, based on the calculated force estimated to be applied by the second object, and store the calculated action force in the memory for grid points of the grid corresponding to a cell comprising the detected colliding particle of the first object.

20. An apparatus for modeling objects, the apparatus comprising:
a memory configured to store a program to control an operation of the apparatus; and
at least one processor configured to execute the program to control the processor to detect an adjacent area sharing modeled particles of a first object and modeled particles of a second object, to define a grid comprising a plurality of cells with respect to the adjacent area, to calculate an action force between the first object and the second object in the adjacent area based on information for grid points of the grid, and to model the first object and the second object based on the calculated action force.

21. A computer implemented method of modeling objects, the method comprising:
detecting, using a computer, an adjacent area sharing modeled particles of a first object and modeled particles of a second object;
selectively modifying, using the computer, shapes or motions of the first and second objects, for particles of the adjacent area, based on calculated reactionary forces between detected colliding particles of the first object and the second object in the adjacent area and in response to collisions being determined to occur in cell units of the adjacent area; and
selectively modifying, using the computer, positions of particles of the first object outside of the adjacent area based on repulsive forces applied to the particles of the first object outside of the adjacent area for collision avoidance.

22. The method of claim 21, wherein the calculated reactionary forces between the detected colliding particles of the first object and the second object are forces based on positions of particles of the first object being changed so as to not penetrate the second object.

* * * * *